(12) United States Patent
Pearson et al.

(10) Patent No.: US 11,415,026 B2
(45) Date of Patent: Aug. 16, 2022

(54) PASS THROUGH TIMING PIN SYSTEM

(71) Applicant: Cummins Inc., Columbus, IN (US)

(72) Inventors: Taylor Lee Pearson, Lakewood, NY (US); Steven John Small, Columbus, IN (US); Pablo Aguilar Diaz Tejeiro, Columbus, IN (US); Nicklas E. Sherman, Lakewood, NY (US); Justin Kale Wright, Freetown, IN (US); Amey Ashok Vaze, Pune (IN); Kunal Sanjeev Kapadnis, Pune (IN)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/496,865

(22) Filed: Oct. 8, 2021

(65) Prior Publication Data
US 2022/0025787 A1 Jan. 27, 2022

Related U.S. Application Data

(63) Continuation of application No. PCT/US2019/026451, filed on Apr. 9, 2019.

(51) Int. Cl.
*F01L 1/053* (2006.01)
*F01L 1/02* (2006.01)
*F01L 1/047* (2006.01)

(52) U.S. Cl.
CPC ............... *F01L 1/053* (2013.01); *F01L 1/026* (2013.01); *F01L 2001/0476* (2013.01);
(Continued)

(58) Field of Classification Search
CPC ... F01L 1/026; F01L 2001/0476; F01L 1/053; F01L 2303/01; F01L 2303/02
(Continued)

(56) References Cited

U.S. PATENT DOCUMENTS 6,758,176 B2 7/2004 Wada et al.
7,699,032 B2 * 4/2010 Muller ............... F01L 1/34413
123/90.6
(Continued)

OTHER PUBLICATIONS

International Search Report; International Searching Authority; International Application No. PCT/US2019/026451 dated Jun. 24, 2019; 2 pages.
(Continued)

*Primary Examiner* — Jorge L Leon, Jr.
(74) *Attorney, Agent, or Firm* — Taft Stettinius & Hollister LLP

(57) ABSTRACT

A system for timing a crankshaft and a camshaft in an internal combustion engine having a cylinder head structure with a timing pin hole and a camshaft cavity. The camshaft has a first opening that extends from an outer annular wall of a first shaft towards a longitudinal axis. A cam bushing having a bushing clearance hole is inserted into the camshaft cavity and the camshaft is assembled with the cam bushing and cylinder head structure to align the bearing clearance hole with first opening of the camshaft. A timing pin is inserted through the timing pin hole, bushing clearance hole, and first opening of the camshaft to position the camshaft in a camshaft timing position. The crankshaft is rotated to a crankshaft timing position either before or after the camshaft is rotated for setting a static timing of the crankshaft and camshaft, and the timing pins are removed.

20 Claims, 6 Drawing Sheets

(52) U.S. Cl.
CPC ....... *F01L 2250/06* (2013.01); *F01L 2303/01* (2020.05); *F01L 2303/02* (2020.05)

(58) Field of Classification Search
USPC .............................. 123/90.27, 90.31, 90.34
See application file for complete search history.

(56) References Cited

U.S. PATENT DOCUMENTS

| | | |
|---|---|---|
| 8,171,903 B2 | 5/2012 | Kim |
| 8,677,962 B2 | 3/2014 | Vukovich et al. |
| 2017/0183985 A1 | 6/2017 | Greenberg et al. |
| 2018/0320774 A1 | 11/2018 | Moon et al. |

OTHER PUBLICATIONS

Written Opinion of the International Searching Authority; International Searching Authority; International Application No. PCT/US2019/026451; dated Jun. 24, 2019; 6 pages.

International Preliminary Report on Patentability; International Searching Authority; International Application No. PCT/US2019/026451; dated Oct. 21, 2021; 7 pages.

\* cited by examiner

PASS THROUGH TIMING PIN SYSTEM

CROSS-REFERENCE TO RELATED APPLICATIONS

The present application is a continuation of International Patent Application No. PCT/US19/26451 filed on Apr. 9, 2019, which is incorporated herein by reference.

BACKGROUND

The present invention relates to operation of an internal combustion engine system, and more particularly, but not exclusively, relates to use of a timing pin for timing a crankshaft and/or camshaft of an internal combustion engine.

Various approaches have been developed to calibrate timing of operation of various components of an internal combustion engine relative to the engine piston position for maximizing engine performance and a proper fueling event. For example, one approach includes setting or timing an angular position of a camshaft relative to an angular position of a crankshaft such that the valve timing is accurate to achieve a proper fueling event. Many attempts to ensure proper timing of the camshaft, the crankshaft, and/or valves relative to the piston position during engine assembly or maintenance have involved inaccurate and/or complicated procedures.

One such device for timing of valves of an internal combustion engine includes holding a crankshaft and camshaft in immovable positions and subsequently fastening a force transmitting element such as a chain or gear drive to the fixed shafts. The crankshaft and camshaft are each held in immovable positions by screwing adjusting pins into the crankcase of the engine and into threadable contact with holes provided in the camshaft and the crankshaft. By locking the crankshaft and camshaft in immovable positions by using screws threadably inserted into holes, the manufacturing tolerances of these holes must be very tight to precisely locate and align the openings to receive the screws therein such that the threads on the respective parts engage one another. To accomplish this alignment, the labor must be highly skilled which also increases the costs associated with setting the timing between the crankshaft and the camshaft during manufacturing or maintenance. Additionally many tools are necessary for adjusting the timing of the crankshaft and camshaft and threadably engaging the screws into the holes.

Therefore, further contributions in this area of technology are needed to provide improved techniques for timing the angular position of the camshaft relative to the angular position of the crankshaft. Further contributions are needed to provide improved timing techniques for a lower cost and less tooling.

SUMMARY

Certain embodiments of the present application includes unique systems, methods and apparatus for static timing of a camshaft relative to a crankshaft of an internal combustion engine using a timing pin. A unique system includes a cylinder head structure of the internal combustion engine having a timing pin hole sized to receive a timing pin. The cylinder head structure can include a cylinder block. The system further includes a cam bushing or bearing shell having a bushing clearance hole for aligning the cam bushing with a camshaft of the internal combustion engine to further position the camshaft in a predetermined position. The cam bushing includes an opening having an inner diameter sized to receive an outer annular wall of first shaft or portion of the camshaft. The cam bushing can optionally include an oil feed hole that is offset from the bushing clearance hole. The camshaft has a longitudinal axis with a first shaft that spans along at least a portion of the longitudinal axis, the first shaft having an outer annular wall that defines a first opening that extends towards the longitudinal axis. The camshaft is rotatable to a predetermined position for static timing of the camshaft relative to the crankshaft. The camshaft is inserted into the opening of the cam bushing which is assembled into the cylinder head structure or cylinder block and then rotated to the predetermined position. In the predetermined position, a tolerance of the bushing clearance hole relative to each of the first opening of the camshaft and the timing pin hole is quite small. When the camshaft is in the predetermined position, the bushing clearance hole is aligned with the timing pin hole of the cylinder head structure and further aligned with the first opening of the camshaft. The timing pin has a length sufficient to pass through the timing pin hole, the bushing clearance hole, and into a portion of the first hole of the camshaft to rotationally fix the camshaft in the predetermined position. When the camshaft is in the predetermined position, the timing pin can be inserted into the timing pin hole, the bushing clearance hole, and into the first opening of the camshaft without the use of any tools which makes for a quick and easy installation and timing technique to time an engine. The integration of the timing pin hole in the cylinder head structure or cylinder block and the first opening in the camshaft reduces the need for additional features in the cylinder head structure that drive spatial consumption and additional machined geometry.

A crankshaft of the internal combustion engine is rotatable to a predetermined position for static timing of the crankshaft relative to the camshaft. Both of the crankshaft and the camshaft are rotated to their respective predetermined positions for setting the static timing of the camshaft relative to the crankshaft or the crankshaft relative to the camshaft. A second timing pin can be used to secure the crankshaft in the predetermined position. A gear train is assembled with the internal combustion engine prior to removing the timing pin from the cylinder head structure, the cam bushing, and the camshaft. Both the timing pin and the second timing pin are removed. The timing pin is removed from the timing pin hole, the bushing clearance hole, and the first hole of the camshaft wherein the camshaft is maintained in its correct predetermined position. The second timing pin is removed from the crankshaft wherein the crankshaft is maintained in its correct predetermined position.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DETAILED DESCRIPTION OF REPRESENTATIVE EMBODIMENTS

Figure 1:
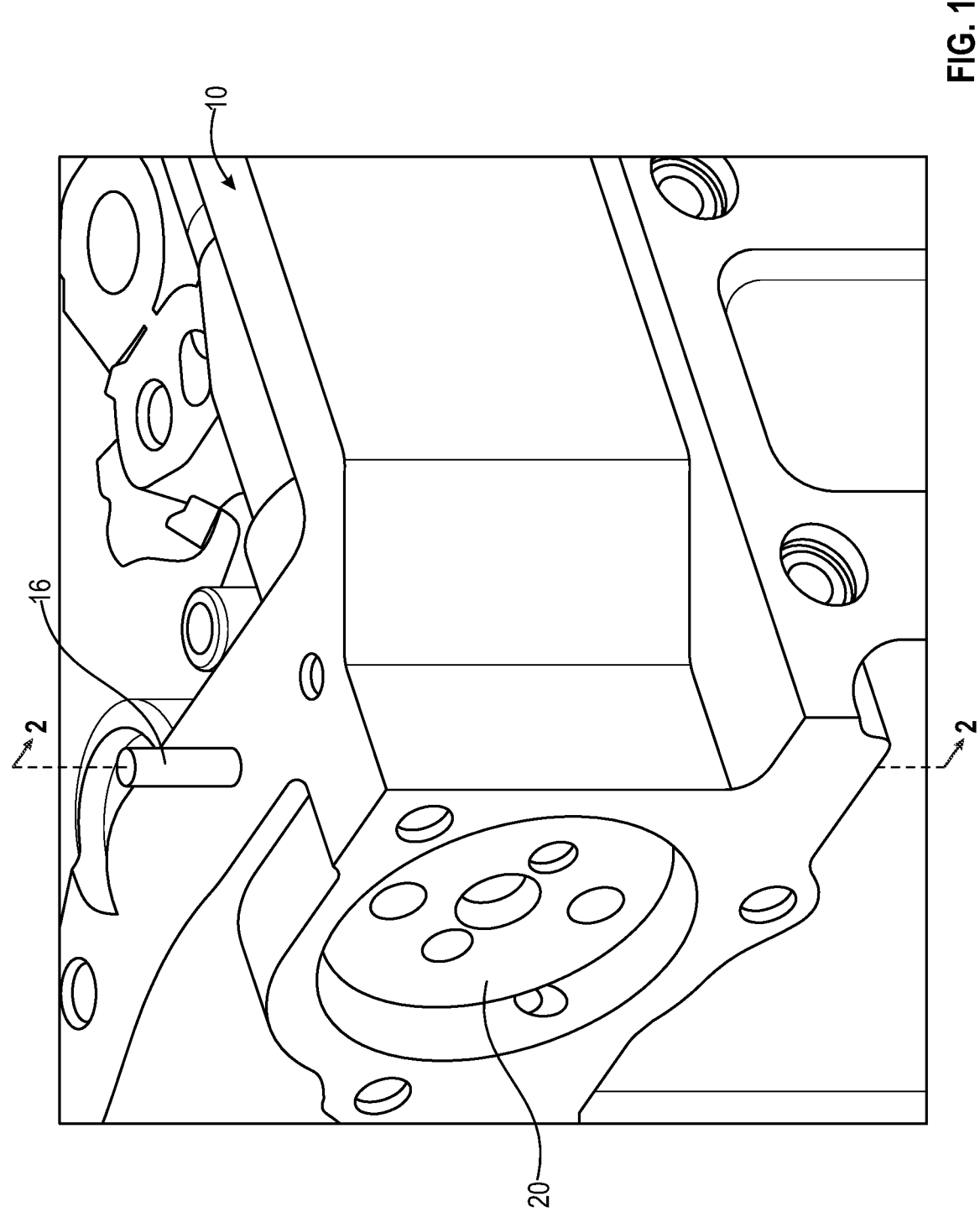
FIG. 1 is a partial perspective view of one embodiment illustrating a timing pin inserted in a cylinder head structure and a camshaft of an internal combustion engine.

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein are contemplated as would normally occur to one skilled in the art to which the invention relates.

Figure 2:
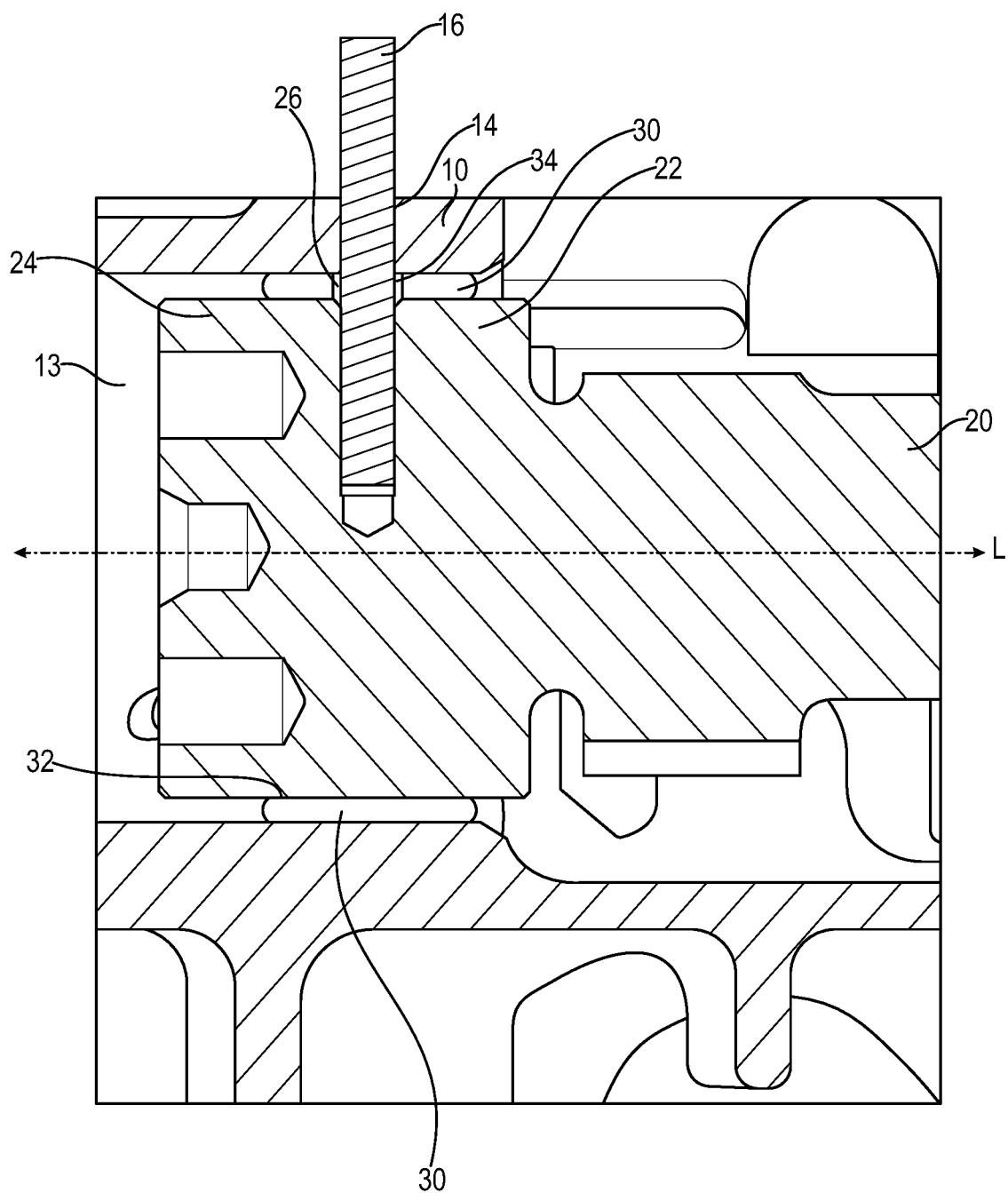
FIG. 2 is a cross-sectional view of the embodiment of FIG. 1.

With reference to FIGS. 1 and 2, a cylinder head structure 10 for an internal combustion engine 12 is illustrated. The internal combustion engine 12 includes a four-stroke internal combustion engine, but any engine type is contemplated, including compression ignition, spark-ignition, and/or diesel. The engine 12 can include a plurality of cylinders 11. FIG. 1 illustrates the plurality of cylinders 11 in an arrangement that includes six cylinders 11 in an in-line arrangement for illustration purposes only. Any number of cylinders and any arrangement of the cylinders suitable for use in an internal combustion engine can be utilized. The number of cylinders 11 that can be used can range from one cylinder to eighteen or more.

The cylinder head structure 10 includes a timing pin hole 14 therein that is sized to receive a timing pin 16. The cylinder head structure 10 includes any portion of the cylinder block or cylinder head that contains a camshaft 20 in a camshaft cavity 13. Although only one camshaft 20 is illustrated, it is contemplated that a plurality of the camshafts 20 can be assembled with the internal combustion engine 12 and a corresponding timing pin hole 14 and timing pin 16 are present for each of the camshafts 20.

The camshaft 20 is positioned in the cylinder head structure 10 such that the camshaft 20 is rotatable to a camshaft timing position or predetermined position for setting the static timing of the engine 12. The camshaft 20 has a longitudinal axis L that spans along the length thereof with a first shaft 22 that spans along at least a portion of the longitudinal axis L. The first shaft 22 has an outer annular wall 24 that defines a first opening 26 that extends towards the longitudinal axis L. When the camshaft 20 is rotated to the predetermined position, the first opening 26 substantially aligns with the timing pin hole 14 of the cylinder head structure 10. The first opening 26 is cylindrical in shape and has a diameter that corresponds with a diameter of the timing pin hole 14. The first opening 26 has a length that is sized to receive a portion of the timing pin 16 therein to retain the camshaft 20 in a locked or fixed position. The timing pin 16 inserted into the timing pin hole and the first opening 26 of the camshaft 20 ensures that the camshaft 20 is consistently positioned in a precise location and relationship with the cylinder head structure 10 and a crankshaft 40 when assembled with the camshaft 20.

Figure 3:
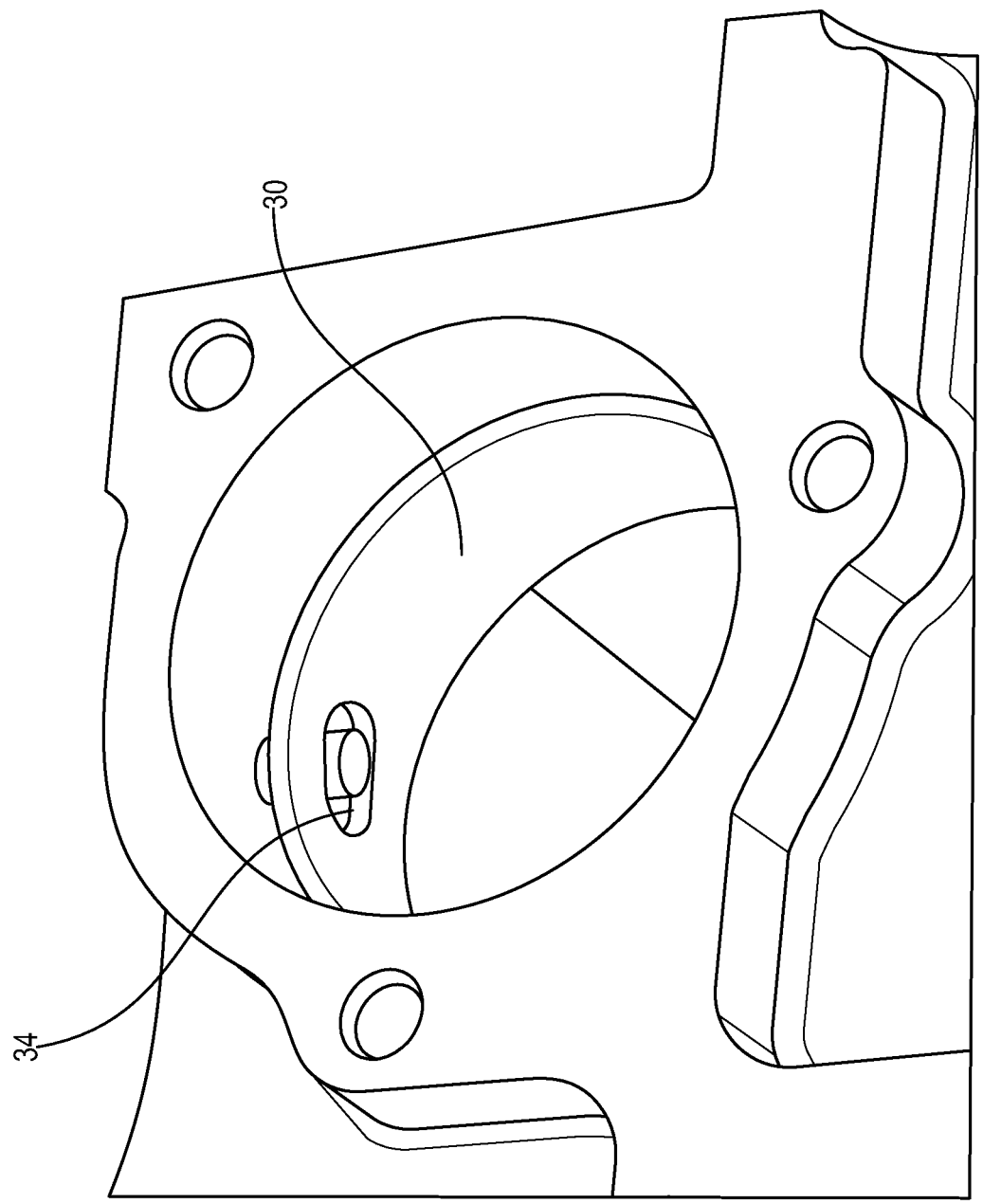
FIG. 3 is a perspective view of the embodiment of FIG. 1 without the camshaft.
Figure 4:
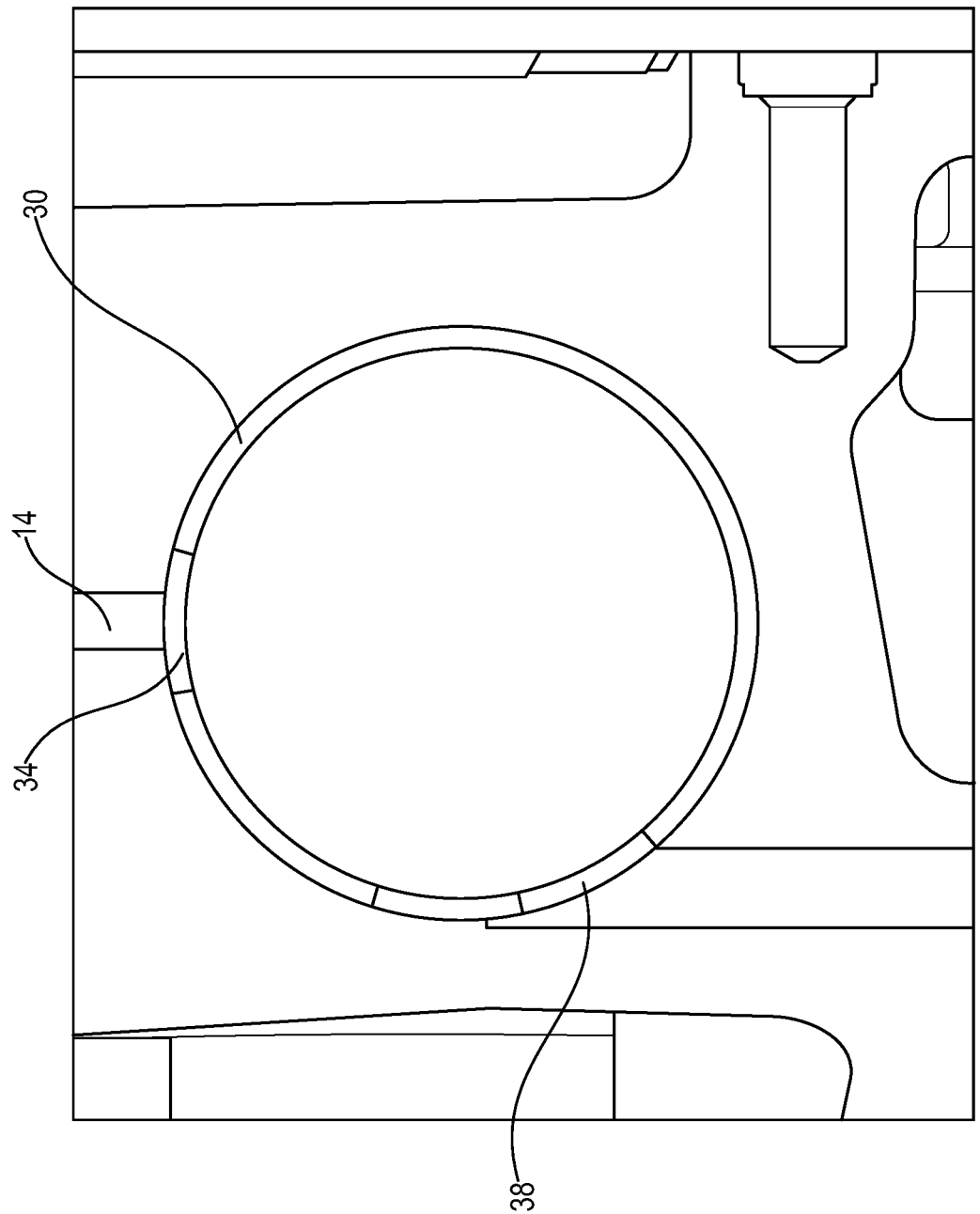
FIG. 4 is a cross-sectional view of the embodiment of FIG. 1 without the camshaft.

With continued reference to FIGS. 1 and 2, and now reference to FIGS. 3 and 4, a cam bushing or bearing shell 30 is assembled with the cylinder head structure 10 and the camshaft 20. The cam bushing or bearing shell 30 is press fit into the camshaft cavity 13 of the cylinder head structure 10. In this illustrated form, the cam bushing 30 has an inner diameter of an opening 32 sized to receive the outer annular wall 24 of the first shaft 22 of the camshaft 20. The first shaft 22 of the camshaft 20 slides into the inner diameter or opening 32 with clearance to allow for oil to flow between the camshaft 20 and the opening 32. The cam bushing 30 is symmetrical to reduce the possibility of installing the cam bushing 30 backwards. The cam bushing 30 has a bushing clearance hole 34 that is sized to receive the timing pin 16 therein. As illustrated the bushing clearance hole 34 can be elongated or a slot shape and may be larger than the timing pin hole 14. The bushing clearance hole 34 may be located axially and rotationally as needed on the cam bushing 30. As illustrated, the bushing clearance hole 34 is positioned in the middle of the cam bushing 30 and can beneficially lower stresses and unnecessarily narrow regions that support the oil film. The cam bushing 30 is positioned such that the bushing clearance hole 34 is aligned with the first opening 26 of the camshaft 20. When the camshaft 20 is positioned in the predetermined position, the bushing clearance hole 34 is aligned with the timing pin hole 14 of the cylinder head structure 10. Alternatively, the cam bushing 30 may be positioned such that the bushing clearance hole 34 is rotationally offset from the timing pin hole 14. In one form, the bushing clearance hole 34 could have a rotational offset. When the camshaft 20 is in the predetermined position, the bushing clearance hole 34 is aligned with both of the first opening 26 of the camshaft 20 and the timing pin hole 14 to receive the timing pin 16 therein to retain the camshaft 20 in a locked or fixed position. The cam bushing 30 optionally includes an oil feed hole 38 that is circumferentially spaced from the bushing clearance hole 34 wherein the oil feed hole 38 is configured to provide oil or other lubricating fluid to the camshaft 20. The oil feed hole 38 can be the same size as the bushing clearance hole 34 to allow the cam bushing 30 to be flipped. Alternatively, the cam bushing 30 may not include the oil feed hole 38 in other forms.

The timing pin 16 is configured for insertion through the timing pin hole 14, the bushing clearance hole 34, and into a portion of the first opening 26 of the first shaft 22 of the camshaft 20 to lock the camshaft 20 in the camshaft timing position. The timing pin 16 is cylindrical in shape; however alternatively the timing pin 16 may include a tapered end portion for easier insertion.

Figure 5:
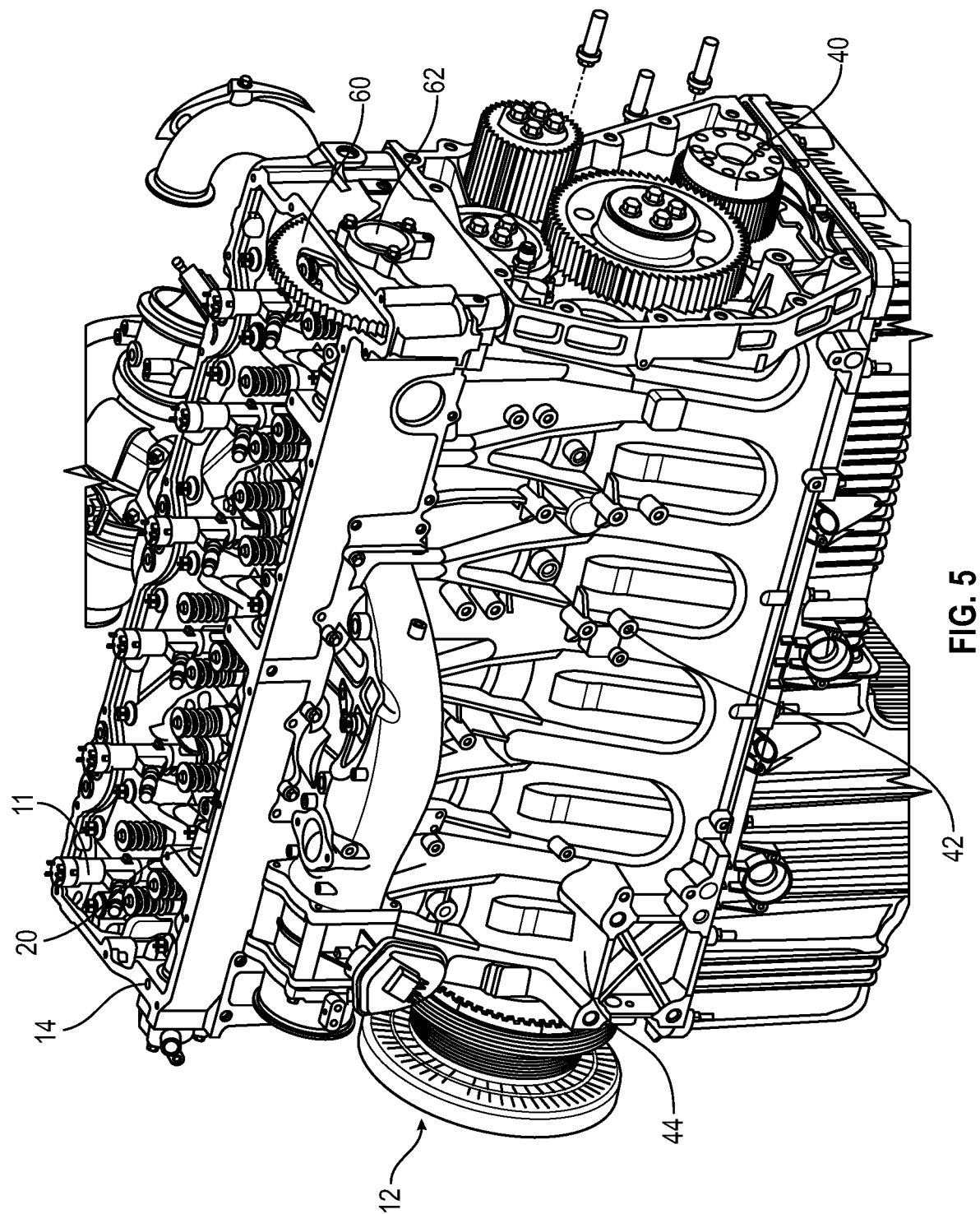
FIG. 5 is a perspective view of the embodiment of FIG. 1.

With reference to FIG. 5, the internal combustion engine 12 includes an engine block 44 sized to receive a crankshaft 40 therein. The crankshaft 40 is rotatable to a crankshaft timing position or a predetermined position to set the static timing of the internal combustion engine 12. The crankshaft 40 has a second opening or hole (not illustrated) that is sized to receive a second timing pin (not illustrated). The engine block 44 includes a second hole 42 that is configured to receive the second timing pin therein and align with the second opening or hole of the crankshaft 40 when the crankshaft is rotated to the crankshaft timing position or predetermined position to fix or lock the rotational position of the crankshaft 40 for setting the static timing between the crankshaft 40 and the camshaft 20.

With reference to FIG. 5, the internal combustion engine 12 includes a gear train 60 that is operable connected to the camshaft 20 to drive the camshaft 20. In one form, one or more fasteners such as bolts 62 are assembled with the gear train 60 to hold the gear train 60 onto the camshaft 20. In another form, no fasteners are used and instead the gear train 60 is shrink fit or press fit onto the camshaft 20 and/or the crankshaft 40.

After the camshaft 20 and the crankshaft 40 are timed relative to each other, the timing pin 16 is removed from the timing pin hole 14, the bushing clearance hole 34, and the first opening 26 of the first shaft 22 of the camshaft 20 such that the camshaft 20 is maintained in the camshaft timing position or predetermined position. Similarly the second timing pin is removed from the crankshaft 40 such that the crankshaft 40 is maintained in the crankshaft timing position or predetermined position.

Figure 6:
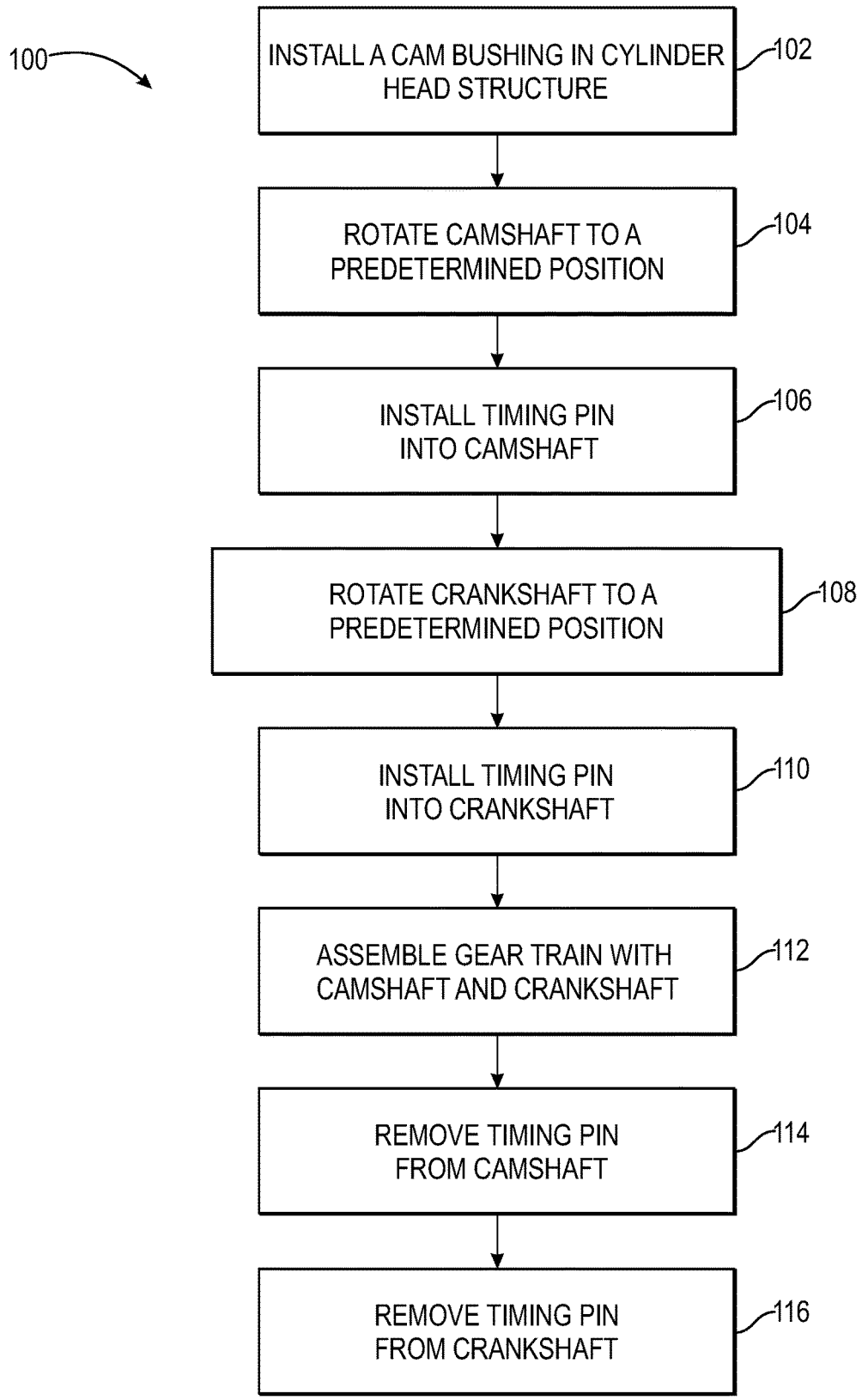
FIG. 6 is a flow diagram of a procedure for static timing of the camshaft relative to the crankshaft of the embodiment of FIG. 1.

With reference to FIG. 6 is a flow diagram of a procedure 100 for static timing of the camshaft 20 relative to the crankshaft 40 or alternatively the static timing of the crankshaft 40 relative to the camshaft 20 of the embodiment of FIG. 1. Procedure 100 begins at operation 102 to install the cam bushing 30 in the cylinder head structure 10. The cam bushing 30 is positioned or press fit in the camshaft cavity 13 of the cylinder head structure 10 such that the bushing clearance hole 34 is aligned with the timing pin hole 14. The cam bushing 30 is assembled with the camshaft 20 such that the outer annular wall 24 of the first shaft 22 of the camshaft 30 slides into the inner diameter or opening 32 of the cam bushing 30 such that bushing clearance hole 34 is aligned with the first opening 26 of the camshaft 30.

Procedure 100 continues at operation 104 in which the camshaft 30 is rotated to a predetermined position or the camshaft timing position. In this predetermined position, the timing pin hole 14, the bushing clearance hole 34, and the first opening 26 are all substantially axially aligned. Procedure 100 continues at operation 106 wherein the timing pin 16 is installed into the camshaft 20. The timing pin 16 is inserted into the timing pin hole 14 and through the bushing clearance hole 34 and further into the first opening 26 of the camshaft 20. After installing the timing pin 16 into the camshaft 20, the rotational position of the camshaft 20 is fixed for setting the static timing of the crankshaft 40 relative to the camshaft 20 or the camshaft 20 relative to the crankshaft 40.

Procedure 100 continues at operation 108 in which the crankshaft 40 is rotated to a predetermined position or the crankshaft timing position. Alternatively, operation 108 can take place before operation 104 such that first the crankshaft 40 is rotated to the crankshaft timing position or predetermined position and thereafter the camshaft 30 is rotated to the camshaft timing position or predetermined position.

Procedure 100 continues at operation 110 wherein a second timing pin is installed into the crankshaft 40. The second timing pin is inserted into the second hole 42 of the engine block 44 and into the crankshaft 40 to fix the rotational position of the crankshaft 40 for setting the static timing of the crankshaft 40 relative to the camshaft 20 or the camshaft 20 relative to the crankshaft 40. Once the camshaft 20 and the crankshaft 40 are locked into their desired predetermined positions, the static timing between the camshaft 20 and the crankshaft 40 is precisely achieved to provide the proper timing for the internal combustion engine 12.

Procedure 100 continues at operation 112 in which the gear train 60 is secured to the internal combustion engine 12 such that the gear train 60 is operable to drive the camshaft 20. At operation 112, one or more gears of the gear train 60 can be added to the engine 12 and one or more bolts or other fasteners 62 can be tightened such that the gears are fastened to the camshaft 20 and crankshaft 40. Operation 112 also includes assembling one or more fasteners 62 with the gear train 60 to hold the gear train 60 onto the camshaft 20.

Procedure 100 continues at operation 114 wherein the timing pin 16 is removed from the cylinder head structure 10. The timing pin 16 is pulled away from the timing pin hole 14, the bushing clearance hole 34, and the first opening 26 such that the camshaft 20 can rotate.

Procedure 100 continues at operation 116 wherein the second timing pin is removed from the engine block 44. The second timing pin is pulled away from the crankshaft 40 such that the crankshaft 40 can rotate.

Various aspects of the present disclosure are contemplated. According to one aspect, a method, comprising: rotating a camshaft in an internal combustion engine into a predetermined position, the camshaft having a longitudinal axis with a first shaft that spans along at least a portion of the longitudinal axis, the first shaft having an outer annular wall that defines a first opening that extends towards the longitudinal axis, the internal combustion engine having a cylinder head structure with a timing pin hole that aligns with the first opening when the camshaft is in the predetermined position, the internal combustion engine having a cam bushing located in a camshaft cavity of the cylinder head structure, the bushing having a bushing clearance hole; rotating a crankshaft in the internal combustion engine into a predetermined position; inserting a timing pin through both of the timing pin hole and the bushing clearance hole and further into the first opening of the first shaft of the camshaft to rotationally fix the camshaft relative to the crankshaft; and removing the timing pin from the cylinder head structure, the cam bushing, and the camshaft.

According to one aspect the method further comprises moving the cam bushing relative to the cylinder head structure to align the bushing clearance hole axially with the timing pin hole of the cylinder head structure.

According to a second aspect the method further comprises prior to removing the timing pin, securing a gear train to the internal combustion engine wherein the gear train is operable to drive the camshaft. According to a further aspect the method further comprises assembling one or more fasteners into the gear train to hold the gear train onto the camshaft.

According to third aspect the method further comprising wherein the crankshaft includes a second opening; and inserting a second timing pin through a second hole in an engine block of the internal combustion engine and further inserting the second timing pin into the second opening of the crankshaft to fix the rotational position of the crankshaft. According to a further aspect of the method the rotating the crankshaft occurs before the rotating the camshaft.

According to another aspect a method, comprises providing an internal combustion engine having a cylinder head structure with a timing pin hole therein, the internal combustion engine having a camshaft and a crankshaft each rotatably mounted therein, the camshaft having a longitudinal axis with a first shaft that spans along at least a portion of the longitudinal axis, the first shaft having an outer annular wall that defines a first opening that extends towards the longitudinal axis, the internal combustion engine having a cam bushing located in a camshaft cavity of the cylinder head structure, the bushing having a bushing clearance hole; inserting a timing pin through the timing pin hole, the bushing clearance hole, and into the first opening of the first shaft of the camshaft to position the camshaft in a camshaft timing position; rotating the crankshaft to a crankshaft timing position for setting a static timing of the crankshaft relative to the camshaft; and removing the timing pin from the timing pin hole, the bushing clearance hole, and the first opening of the first shaft of the camshaft.

According to one aspect of the method further comprising moving the cam bushing relative to the cylinder head structure to align the bushing clearance hole axially with the timing pin hole of the cylinder head structure.

According to a second aspect of the method the cam bushing includes an oil feed hole.

According to a third aspect of the method further comprising prior to removing the timing pin, securing a gear train to the internal combustion engine wherein the gear train is operable to drive the camshaft. According to a further aspect of the method further comprising wherein the crankshaft includes a second opening; and inserting a second timing pin through a second hole in an engine block of the internal combustion engine and further inserting the second timing pin into the second opening of the crankshaft to fix the rotational position of the crankshaft.

According to a fourth aspect of the method the rotating the crankshaft occurs before the inserting the timing pin.

According to a fifth aspect of the method the timing pin includes a tapered portion.

According to yet another aspect a system, comprising: a cylinder head structure for an internal combustion engine, the cylinder head structure having a timing pin hole and a camshaft cavity therein; a camshaft for the internal combustion engine that is rotatable to a camshaft timing position, the camshaft having a longitudinal axis with a first shaft that spans along at least a portion of the longitudinal axis, the first shaft having an outer annular wall that defines a first opening that extends perpendicularly towards the longitudinal axis; a cam bushing located in the camshaft cavity, the cam bushing having a bushing clearance hole; and a timing pin configured for insertion through the timing pin hole, the bushing clearance hole, and into the first opening of the first shaft of the camshaft to lock the camshaft in the camshaft timing position.

According to one aspect the system includes the cam bushing is positionable relative to the cylinder head structure to align the bushing clearance hole axially with the timing pin hole of the cylinder head structure.

According to a second aspect the system includes the cam bushing includes an oil feed hole.

According to a third aspect the system further comprising a crankshaft for the internal combustion engine that is rotatable to a crankshaft timing position, the crankshaft having a second opening; and a second timing pin configured for insertion through a second hole in an engine block of the internal combustion engine and further into the second opening of the crankshaft to fix the rotational position of the crankshaft.

According to a fourth aspect the system further comprising a gear train for the internal combustion engine wherein the gear train is operable to drive the camshaft.

According to a fifth aspect the system further comprising one or more fasteners assembled with the gear train to hold the gear train onto the camshaft.

According to a sixth aspect the system includes the timing pin is removed from the timing pin hole, the bushing clearance hole, and the first opening of the first shaft of the camshaft such that the camshaft is maintained in the camshaft timing position.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
rotating a camshaft in an internal combustion engine into a first predetermined position, the camshaft including a longitudinal axis and a first shaft that spans along at least a portion of the longitudinal axis, the first shaft including an outer annular wall defining a first opening that extends towards the longitudinal axis, the internal combustion engine including a cylinder head structure defining a timing pin hole configured to align with the first opening when the camshaft is in the first predetermined position, the internal combustion engine further including a cam bushing located in a camshaft cavity of the cylinder head structure, the cam bushing defining a bushing clearance hole;
rotating a crankshaft in the internal combustion engine into a second predetermined position;
inserting a timing pin through the timing pin hole, the bushing clearance hole, and into the first opening so as to rotationally fix the camshaft relative to the crankshaft; and
removing the timing pin from the cylinder head structure, the cam bushing, and the camshaft.

2. The method of claim 1, further comprising:
axially moving the cam bushing relative to the cylinder head structure so as to align the bushing clearance hole with the timing pin hole.

3. The method of claim 1, further comprising:
securing a gear train to the internal combustion engine prior to the removing of the timing pin, the gear train operable to drive the camshaft.

4. The method of claim 3, wherein:
the gear train is fixed to the camshaft via one or more fasteners.

5. The method of claim 1, further comprising:
inserting a second timing pin through a second hole in an engine block of the internal combustion engine, and into the into a second opening in the crankshaft so as to lock the crankshaft in the second predetermined position.

6. The method of claim 5, wherein the rotating of the crankshaft occurs before the rotating of the camshaft.

7. A method, comprising:
providing an internal combustion engine including a rotatably mounted camshaft, a rotatably mounted crankshaft, and a cylinder head structure defining a timing pin hole, the camshaft including a longitudinal axis and a first shaft that spans along at least a portion of the longitudinal axis, the first shaft including an outer annular wall defining a first opening that extends towards the longitudinal axis, the cylinder head structure including a camshaft cavity configured to receive a cam bushing of the internal combustion engine, the cam bushing defining a bushing clearance hole;

inserting a timing pin through the timing pin hole, the bushing clearance hole, and into the first opening so as to position the camshaft in a camshaft timing position;

rotating the crankshaft to a crankshaft timing position configured to set a static timing of the crankshaft relative to the camshaft; and removing the timing pin from the timing pin hole, the bushing clearance hole, and the first opening.

8. The method of claim 7, further comprising:

axially moving the cam bushing relative to the cylinder head structure so as to align the bushing clearance hole with the timing pin hole.

9. The method of claim 8, wherein the cam bushing further defines an oil feed hole.

10. The method of claim 7, further comprising:

securing a gear train to the internal combustion engine prior to the removing of the timing pin, the gear train operable to drive the camshaft.

11. The method of claim 10, further comprising:

inserting a second timing pin through a second hole in an engine block of the internal combustion engine and into a second opening in the crankshaft so as to lock the crankshaft in the crankshaft timing position.

12. The method of claim 7, wherein the rotating of the crankshaft occurs before the inserting of the timing pin.

13. The method of claim 7, wherein the timing pin includes a tapered portion.

14. An internal combustion engine system, comprising:

a cylinder head structure defining a timing pin hole and a camshaft cavity;

a camshaft configured to rotate to a camshaft timing position, the camshaft including a longitudinal axis and a first shaft that spans along at least a portion of the longitudinal axis, the first shaft including an outer annular wall defining a first opening that extends towards the longitudinal axis;

a cam bushing arranged in the camshaft cavity, the cam bushing defining a bushing clearance hole; and a timing pin configured for insertion through the timing pin hole, the bushing clearance hole, and into the first opening so as to lock the camshaft in the camshaft timing position.

15. The internal combustion engine system of claim 14, wherein the cam bushing is axially positioned relative to the cylinder head structure so as to align the bushing clearance hole with the timing pin hole.

16. The internal combustion engine system of claim 14, wherein the cam bushing further defines an oil feed hole.

17. The internal combustion engine system of claim 14, further comprising:

an engine block defining a second opening;

a crankshaft configured to rotate to a crankshaft timing position, the crankshaft defining a second opening; and a second timing pin configured for insertion through the second hole and into the second opening so as to lock the crankshaft in the crankshaft timing position.

18. The internal combustion engine system of claim 14, further comprising:

a gear train operable to drive the camshaft.

19. The internal combustion engine system of claim 18, wherein:

the gear train is fixed to the camshaft via one or more fasteners.

20. The internal combustion engine system of claim 14, wherein the timing pin is removed from the timing pin hole, the bushing clearance hole, and the first opening such that the camshaft is maintained in the camshaft timing position.

* * * * *